Figure 1:
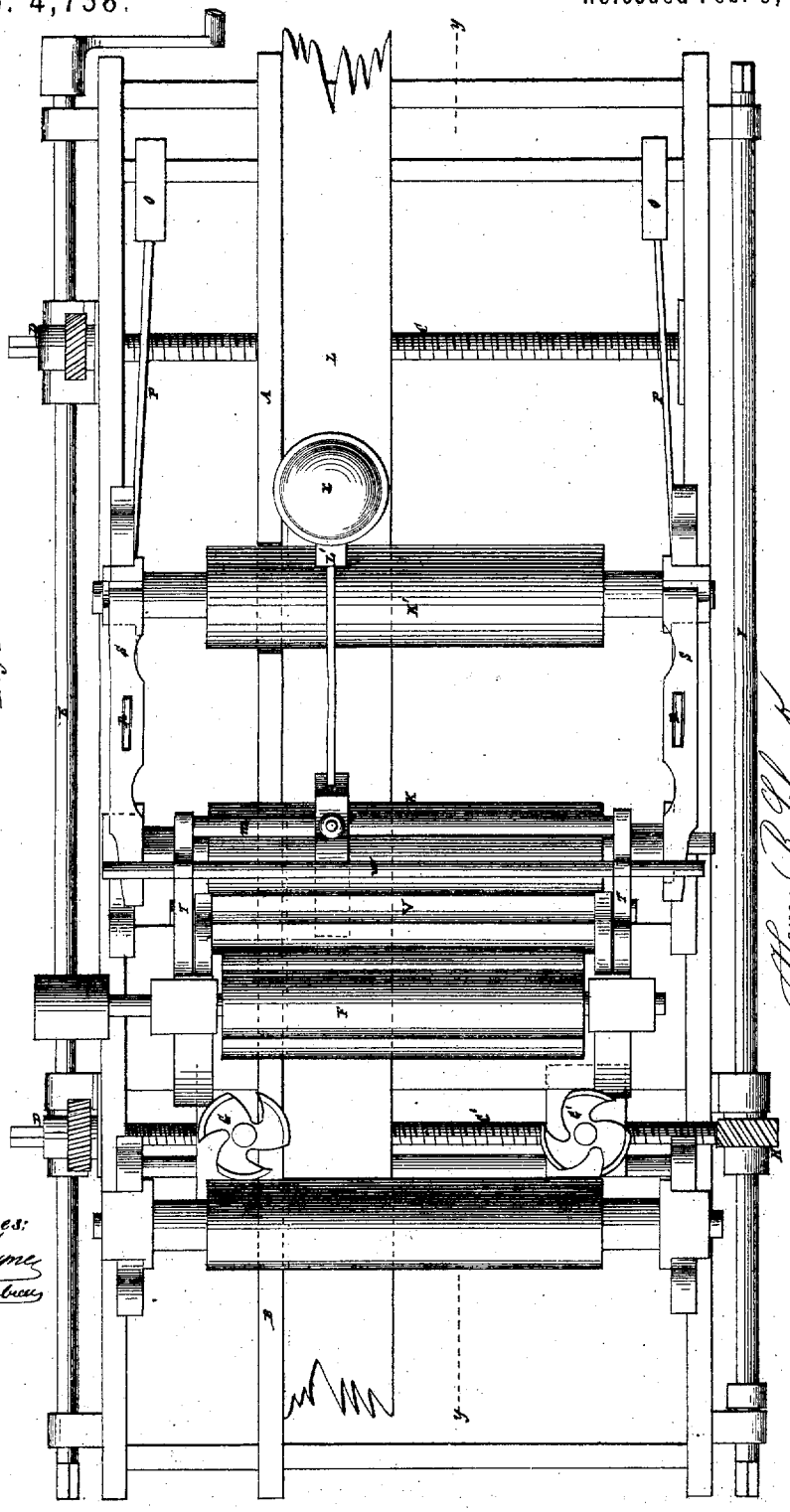

H. B. SCHENCK, W. T. Y. SCHENCK, & A. L. SCHENCK. 2 Sheets--Sheet 1.

Improvement in Planing Machines.

No. 4,738. Reissued Feb. 6, 1872.

Witnesses:
Fred Haynes
W. E. Rabun

Henry B. Schenck
William T. Y. Schenck
Adelbert L. Schenck
by Brown & Coombs
Attorneys

AM. PHOTO-LITHOGRAPHIC CO. N.Y. (OSBORNE'S PROCESS.)

2 Sheets--Sheet 2.
H. B. SCHENCK, W. T. Y. SCHENCK, & A. L. SCHENCK.
Improvement in Planing Machines.
No. 4,738. Reissued Feb. 6, 1872.
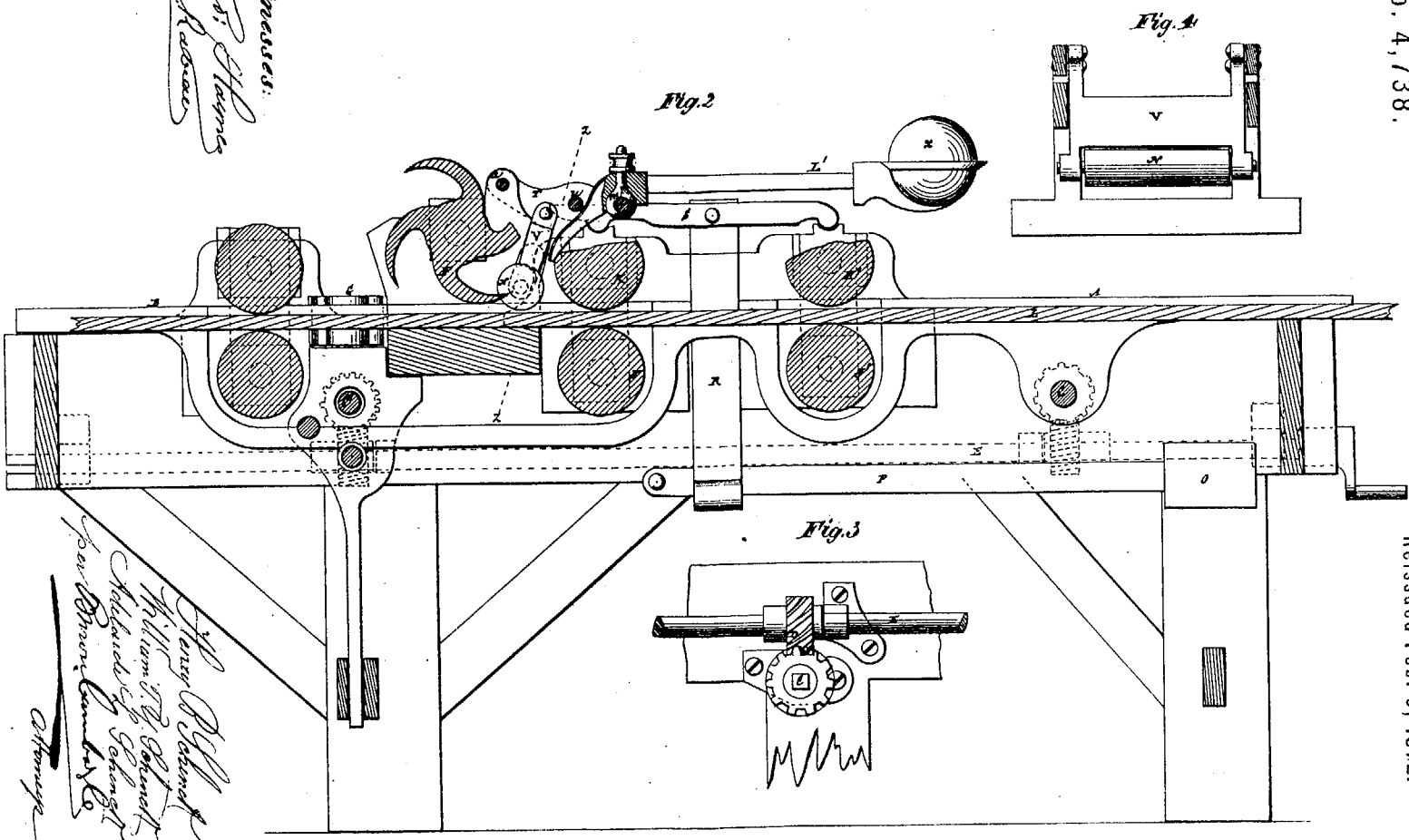
Witnesses:
Fred: Haynes
R. R. Rabrau
Henry B. Schenck
William T. Y. Schenck
Adelaide L. Schenck
per B. Mon. Cambrelle
Attorney
AM. PHOTO-LITHOGRAPHIC CO. N.Y. (OSBORNE'S PROCESS.)

UNITED STATES PATENT OFFICE.

HENRY B. SCHENCK, WILLIAM T. Y. SCHENCK, AND ADELAIDE L. SCHENCK, OF MATTEAWAN, NEW YORK, ASSIGNEES, BY MESNE ASSIGNMENTS, OF JOHN B. SCHENCK, DECEASED.

IMPROVEMENT IN PLANING-MACHINES.

Specification forming part of Letters Patent No. 84,460, dated February 2, 1869; reissue No. 4,738, dated February 6, 1872.

*To all whom it may concern:*

Be it known that the following is a full, clear, and exact description of a new and useful Improvement in Planing-Machines, invented by JOHN B. SCHENCK, now deceased, late of Matteawan, in the county of Dutchess and State of New York, reference being had to the accompanying drawing forming part of this specification.

This invention relates to new and useful improvements in machines known as "Woodworth Planers," whereby they are made much more convenient and useful than they have been prior to this invention. The invention consists: First, in a combination, with the facing-cylinder, of the introducing-guide and one of the matcher-heads, whereby said guide and matcher-head, without changing their relative positions, may be moved across the machine or relatively to the facing-cylinder so as to utilize the cutting-edges of the cutters or planers throughout their entire length. It further consists in the combination of the feed-rollers and intermediate devices with the pressure-roll or bar for the purpose of raising the pressure-roll or bar, before the lumber comes in contact therewith, to prevent said roll from being forced out of position or thrown in contact with the planer. And the invention likewise consists in the combination of the laterally-adjustable weight with the pressure-roll or bar, so that the latter shall bear evenly upon the surface of the lumber to prevent the roll from canting.

In the accompanying drawing, Figure 1 represents a top or plan view of the machine. Fig. 2, Sheet 2, is a vertical longitudinal section of Fig. 1 through the line *y y*. Fig. 3 is a detailed view representing the oblique-toothed gearing, which is used for operating the guides and side cutters of the machine. Fig. 4 is a detached section of Fig. 2 through the line *z z*.

Similar letters of reference indicate corresponding parts.

A represents the introducing-guide and B a delivery-guide of the machine. These guides are separate, and may be separately adjusted; but they are represented as arranged so that they may be moved simultaneously across the machine, and so that their relative positions are preserved. The introducing-guide A is connected with and moved by the screw-shafts C C′. The screws C C′ are revolved by means of the oblique-toothed gearing seen at D D and the shaft E. F represents the facing-cylinder, upon which the facing-cutters are placed. G G′ represent the matcher-heads or side cutters for reducing the width and matching the lumber. The matcher-head G, and introducing-guide A also, when such device is used, the delivery-guide B, are made capable of motion crosswise of the machine and their relative positions maintained at all times. This may be effected simultaneously by revolving the shaft E. By thus rendering the introducing-guide and one matcher-head adjustable relatively to the facing-cylinder, as described, and so that said devices preserve their relative positions, it is practicable to use the facing-cutters throughout their entire length, thus greatly increasing their usefulness and saving much valuable time. J J′ represent the lower feed-rollers, and K K′ the upper introducing feed-rollers. L represents the piece of lumber to be operated upon. N represents the pressure-roll or bar, whichever may be used. This roll or bar is placed immediately in the rear of the facing-cutters, as seen in the drawing. The pressure is brought to bear upon the upper feed-rollers from the weights O O on the levers P P, connecting-bars R R, and saddles S S. The pressure-roll N is connected with two short horizontal levers, T T, which have their fulcrums at *u*. V is a broad bar which extends across the machine, and in this example of my invention forms the connection between the pressure-roll and the levers T T. *w* is a rod which extends across the machine, the ends of which project through the levers T T and rest in bearings on the ends of the saddles S, which rest on the feed-roller boxes, as seen in the drawing.

The effect of this arrangement is as follows: When the piece of lumber is introduced and drawn under the feed-rollers K K′ they are raised more or less according to the thickness of the lumber, so that the weights O O will press them to the lumber and draw the lumber into the machine.

The pressure-roll N is necessarily made small in diameter, so as to bring its bearing-surface on the lumber as near as practicable to the cutters. Said roll is consequently not so readily raised by the contact of the piece of lumber as the larger feed-rollers, and where much is to be taken or cut from the lumber a sudden jumping motion is produced, which sometimes produces disastrous consequences. The arrangement is such that the relative position of the feed-rollers and the pressure-roll are preserved, whether the lumber has more or less to be taken off. For instance: the proper position of the pressure-roll is one-eighth of an inch below the bottom of the upper feed-roller or rollers; and if a board is introduced which raises feed-rollers, say five-eighths of an inch, by the arranging the parts so that the feed-roller K shall raise the pressure-roll or bar—whichever may be used—five-eighths of an inch their relative positions—*i. e.*, the pressure-roll one-eighth of an inch below the feed-roller—would be maintained and all danger avoided. This eighth-of-an-inch projection of the pressure-roll is necessary to give the required pressure upon the board. This is accomplished by raising the projecting ends of the bar *w*, which rest on the saddles S, by the board to be dressed. This motion raises the levers T T, which are directly connected with the bar *v* and pressure-roll, so that when the board is brought under the pressure-roll or bar such roll or bar is raised only one-eighth of an inch instead of five-eighths, as it would be without this device. The advantages of this arrangement will be at once manifest. The pressure-roll being only about two inches in diameter, five-eighths of an inch would be more than it could be safely raised with the weight upon it; and just so when the pressure-bar is used, which is sometimes broken and carried into contact with the cutters, when a thick piece of lumber is introduced; or perhaps the roll or bar will refuse to rise at all, and the lumber is "stuck," the feed is stopped, and the gearing is strained, involving great liability to dangerous accident. This arrangement renders the collision of the roll or bar with the end of the lumber perfectly harmless.

The arrangement for adjusting the weight on the pressure-roll or bar, to prevent the canting or tipping of the roll and equalizing the pressure on the surface of the lumber, is seen in the drawing, where L′ represents a weighted lever, which is made to slide on the rod *m*, by which rod the two short levers T T are connected, so that the weight *x* may be made to bear directly over the piece of lumber in the machine.

The lever may be dispensed with and the weight be made to slide upon the rod *m*. The lever is preferable, because by shifting the weight upon it the amount of pressure may be varied according to the width of the lumber.

The invention is not confined to the particular methods employed for producing the results named. It is known that the details may be varied somewhat and the same or similar results be obtained.

Having thus described the invention, what is here claimed, and desired to be secured by Letters Patent, is—

1. The combination of the guide A and the matcher-head G, adapted to be moved relatively to the facing-cylinder F, substantially as herein described, for the purpose specified.

2. The combination of the feed-roller K, saddles S, rod *w*, levers T, and bar V with the presser-roll N, substantially as described, for the purpose specified.

3. The combination of the adjustable weight, the levers T, and bar V with the presser-roll N, whereby the weight is adapted to bear directly over the piece of lumber being dressed, substantially as described, for the purpose specified.

HENRY B. SCHENCK.
WM. T. Y. SCHENCK.
ADELAIDE L. SCHENCK.

Witnesses:
E. S. PHILLIPS,
WM. H. BUTLER, Jr.